(12) United States Patent
Mölle et al.

(10) Patent No.: US 12,377,698 B2
(45) Date of Patent: Aug. 5, 2025

(54) METHOD FOR THE LOADING-DEPENDENT ADAPTATION OF A SYSTEM AIR VOLUME IN AN AIR SUSPENSION SYSTEM OF A MOTOR VEHICLE

(71) Applicant: Continental Automotive Technologies GmbH, Hannover (DE)

(72) Inventors: Stefan Mölle, Farmsen (DE); Andreas Kind, Hildesheim (DE)

(73) Assignee: Continental Automotive Technologies GmbH, Hannover (DE)

(*) Notice: Subject to any disclaimer, the term of this patent is extended or adjusted under 35 U.S.C. 154(b) by 190 days.

(21) Appl. No.: 18/319,742

(22) Filed: May 18, 2023

(65) Prior Publication Data
US 2023/0373262 A1 Nov. 23, 2023

(30) Foreign Application Priority Data

May 18, 2022 (DE) ........................ 10 2022 204 914

(51) Int. Cl.
*B60G 17/015* (2006.01)
*B60G 17/04* (2006.01)
*B60G 17/052* (2006.01)

(52) U.S. Cl.
CPC ..... *B60G 17/0155* (2013.01); *B60G 17/0424* (2013.01); *B60G 17/0525* (2013.01); *B60G 17/0521* (2013.01); *B60G 2202/152* (2013.01); *B60G 2202/154* (2013.01); *B60G 2400/252* (2013.01); *B60G 2400/51222* (2013.01); *B60G 2400/60* (2013.01); *B60G 2500/2014* (2013.01); *B60G 2500/30* (2013.01)

(58) Field of Classification Search
CPC ............ B60G 17/0155; B60G 17/0416; B60G 17/0424; B60G 17/052–0525; B60G 17/056; B60G 2202/152; B60G 2202/154; B60G 2202/412; B60G 2206/422; B60G 2400/252; B60G 2400/51222; B60G 2400/60; B60G 2500/2014; B60G 2500/30

See application file for complete search history.

(56) References Cited

U.S. PATENT DOCUMENTS

2007/0251575 A1 11/2007 Ilias et al.

FOREIGN PATENT DOCUMENTS

| DE | 102004033524 A1 | 2/2006 |
|---|---|---|
| DE | 102004052765 A1 | 5/2006 |

OTHER PUBLICATIONS

German Office Action Dec. 16, 2022 dated for the counterpart German Patent Application No. 10 2022 204 914.4.

*Primary Examiner* — Phutthiwat Wongwian
*Assistant Examiner* — Mark L. Greene

(57) ABSTRACT

A method for adapting a system air volume in an air suspension system of a motor vehicle, wherein a setpoint system air volume is determined on the basis of a vehicle body weight of the motor vehicle, wherein the setpoint system air volume is set as discretely or variably increasing in relation to the vehicle body weight.

20 Claims, 4 Drawing Sheets

```
                                    500
```

```
┌─────────────────────────────────────────────────────────────────┐
│  Determining a setpoint system air volume on the basis of a     │
│              vehicle body weight of the motor vehicle;          │
│                              502                                │
└─────────────────────────────────────────────────────────────────┘
                                 │
                                 ▼
┌─────────────────────────────────────────────────────────────────┐
│  Setting the setpoint system air volume is set as discretely or │
│     variably increasing in relation to the vehicle body weight  │
│                              504                                │
└─────────────────────────────────────────────────────────────────┘
                                 │
                                 ▼
┌─────────────────────────────────────────────────────────────────┐
│  Setting an adaptation block on the basis of a vehicle body     │
│  weight, wherein within the adaption block no adaptation of     │
│                  the system air volume takes place              │
│                              506                                │
└─────────────────────────────────────────────────────────────────┘
                                 │
                                 ▼
┌─────────────────────────────────────────────────────────────────┐
│       Lifting the adaptation block after a predetermined        │
│                          time period                            │
│                              508                                │
└─────────────────────────────────────────────────────────────────┘
                                 │
                                 ▼
┌─────────────────────────────────────────────────────────────────┐
│  The adaptation of the system air further comprises one of      │
│  taking in ambient air by a compressed air supply device and    │
│  discharging some of the system air volume from the air         │
│                       suspension system                         │
│                              510                                │
└─────────────────────────────────────────────────────────────────┘
```

FIG. 5

METHOD FOR THE LOADING-DEPENDENT ADAPTATION OF A SYSTEM AIR VOLUME IN AN AIR SUSPENSION SYSTEM OF A MOTOR VEHICLE

TECHNICAL FIELD

The embodiments herein related to a method for the loading-dependent adaptation of a system air volume in an air suspension system of a motor vehicle.

BACKGROUND

Electronically controllable air suspension systems for ride-height control of a passenger motor vehicle are sufficiently well known. The main components of the air suspension system are adjustable air springs, which provide springing for the vehicle body, and a compressed air supply device, which provides compressed air. These two components are connected to one another via pneumatic lines. There are also various sensors, such as height and pressure sensors, and a control unit, which is functional as a control and evaluation device. Electromagnetic switching valves, which are actuated by the control unit in order to enable the throughflow of compressed air between the components, are provided in the pneumatic lines. It goes without saying that the sensors and the switching valves are connected to the control unit via electrical lines.

The air suspension system makes it possible to actively change the height/level of the vehicle body in relation to a vehicle axle or the road surface. According to requirements, the air springs are filled or emptied by switching particular valves, in order to adjust the vehicle ride height. Thus, for example, after the loading of the vehicle, ride-height compensation may be carried out, or the vehicle may be lowered during the journey to save fuel.

The spring characteristic of the air springs is essential for setting the vehicle ride height. The spring hardness or the spring characteristic over the entire compression travel results from the air pressure contained in the air spring and the contouring of the rolling piston of the air spring. The volume of air contained can be determined from the current value for the height of the air spring and also its spring-effective surface area and the air pressure. This is so because knowledge of the volume of air contained in the system is important for the operation of the air suspension system. For example, the air suspension systems operating as closed systems require a certain system air volume in order to carry out ride-height adjustment. For this, the system air is pushed back and forth between the air springs and the pressure accumulator. Only when the system air volume is not sufficient for a target height is air drawn in from the surroundings by the air supply device and compressed into the system. If the system air volume is too great, it is discharged from the air suspension system.

Before changes to the ride height can be carried out, however, the volume of air contained in the system is initially determined when the vehicle is first put into operation. This results essentially from the volumes of the air springs and the volume of the pressure accumulator. How such a determination can take place is described for example in DE 10 2004 052 765 A1. The volume of air contained can be determined from the known cross section of the air spring or the generally known geometry of the spring-effective compression space, and also the spring-related height value or volume of the air spring and the measured air pressure in the air spring. The current height value or compression or rebound travel of the air spring is required in this respect, because the compression chamber of the air spring is volume-elastic. Depending on the spring deflection and contouring of the rolling piston, the volume enclosed by the roll bellows changes. The height value of the air spring can be detected for example by sensors attached to the vehicle frame. However, sensors arranged in the air spring are also used for detecting the height.

The pressure sensor provided in the air suspension system is used for determining the air pressure in the air spring. The pressure sensor is for example arranged at a central position in the air suspension system, in order to measure the air pressure in the multiple air springs one after the other. Furthermore, the pressure sensor is also used for measuring the pressure in a pressure accumulator, the volume of which is unchanging and known. Therefore, once the volume of air in all of the air springs and the pressure accumulator has been determined, the determination of the overall system air volume in the air suspension system takes place by addition.

If for example the motor vehicle is then loaded with a load, the vehicle ride height is lowered. In order to compensate for this lowering, the air springs are filled with compressed air from the pressure accumulator. If this volume of compressed air is not sufficient, however, the compressed air supply device must draw in air from the surroundings and increase the system air volume. There is therefore a need for a loading-dependent adaptation of the system air volume. For this, the current weight of the vehicle is determined by means of suitable detection. This loading state or the axle load is then available in the electronic control unit of the air suspension system. If the loading or unloading exceeds a certain system air volume tolerance, the stated adaptation of the system air volume takes place.

According to DE 10 2004 033 524 A1, the adaptation of the system air volume takes place linearly in relation to the determined axle load. Such loading-dependent system air volumes are used in the case of vehicles that have a high loading spread in combination with high ride-height adjustment displacements, while the size of the pressure accumulator is limited by the installation space.

The loading-dependent system air volume has a more uniform control speed when there is varying loading. In spite of set air volume tolerance bands, there is the risk of too frequent and unnecessary adaptation of the system air volume. This is due on the one hand to the uncertainty of the loading detection and on the other hand is caused by the range of the loading and unloading thresholds for a certain system air volume. This is accompanied by premature and increased wear of the compressed air supply device, and also a reduction in the availability of ride-height control processes.

The object of the embodiment is to improve the method for the loading-dependent adaptation of a system air volume of an air suspension system.

SUMMARY

A method for adapting a system air volume in an air suspension system of a motor vehicle, comprises determining a setpoint system air volume on the basis of a vehicle body weight of the motor vehicle, wherein the setpoint system air volume is set as discretely or variably increasing in relation to the vehicle body weight.

The setting of a setpoint system air volume which is discrete or variably increases in relation to the vehicle body weight results in the processes for adapting the system air volume take place less frequently than in the prior art.

Greater vehicle body weight ranges within which the system air volume can lie are admissible by virtue of the finer-set system air volume.

For example, with the discretely increasing setpoint system air volume, it is constant in relation to the vehicle body weight in a first and a second vehicle body weight range. The setpoint system air volume in the second vehicle body weight range is greater than the setpoint system air volume in the first vehicle body weight range.

For example, with the variably increasing setpoint system air volume, it increases at different rates in relation to the vehicle body weight in a first and a second vehicle body weight range. The setpoint system air volume has a greater rate of increase in the second vehicle body weight range than a rate of increase of the setpoint system air volume in the first vehicle body weight range.

According to an embodiment, an adaptation block, within which no adaptation of the system air volume takes place, is set on the basis of a vehicle body weight. An adaptation block is provided for one or more particular ranges of the vehicle body weight. If the current vehicle body weight lies within the weight range of the adaptation block and the system air volume is outside a tolerance band, initially no adaptation of the system air volume is performed. Only when the current vehicle body weight lies outside the weight range of the adaptation block does the adaptation of the system air volume take place. The adaptation block may be lifted after a predetermined time period.

According to a further embodiment, the system air volume is determined from an air volume of a number of air springs and a pressure accumulator of the air suspension system.

The adaptation of the system air volume may take place by taking in ambient air by a compressed air supply device of the air suspension system or by discharging some of the system air volume from the air suspension system by way of an outlet of the air suspension system.

The method is used in an air suspension system of a motor vehicle operating as a closed system. Operating as a closed system means that, during normal operation, the air suspension system uses the system air volume that is in the air suspension system for an adjustment of the vehicle ride height. In other words, for raising and lowering the vehicle, compressed air is displaced between the air springs and the pressure accumulator.

The air suspension system is also controlled electronically by an electronic control unit, which is set up for carrying out the method according to the embodiments.

BRIEF DESCRIPTION OF THE DRAWINGS

Further embodiments emerge from the following description of an exemplary embodiment on the basis of the figures, in which:

FIG. 5 shows a method of setting a system air volume given by way of example.

DETAILED DESCRIPTION

Figure 1:
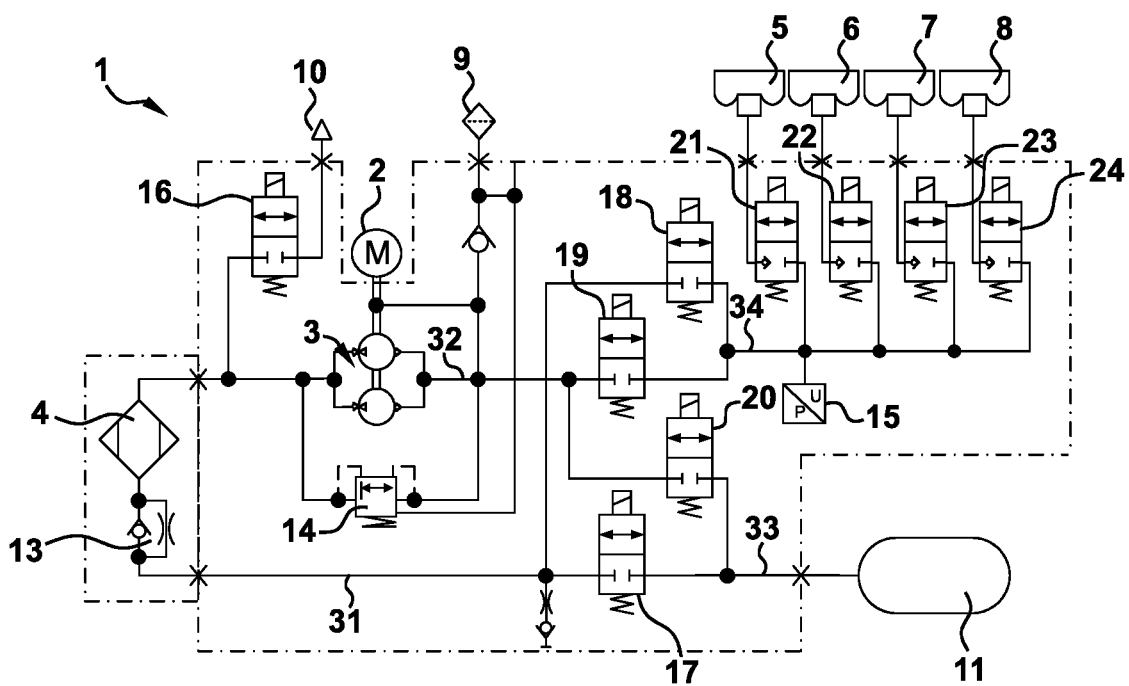
FIG. 1 shows a pneumatic circuit diagram of an air suspension system operating as a closed system.

FIG. 1 shows a pneumatic circuit diagram of an electronically controllable air suspension system 1 of a motor vehicle, wherein the air suspension system 1 operates in closed air supply operation. The air suspension system 1 comprises a compressor 3, which is driven by an electric motor 2, wherein the compressor 3 is designed in the form of a double-piston compressor. Multiple air springs 5 to 8 are respectively assigned as pneumatic control units to a vehicle wheel of the motor vehicle, in order to perform a ride-height adjustment of the vehicle body. Thus, the air springs 5 and 6 are assigned to a first axle, and the air springs 7 and 8 are assigned to a second axle of the motor vehicle. An air spring valve 21 to 24 is connected upstream of each air spring 5 to 8.

Also, the air suspension system 1 comprises a dryer 4, which is set up for drying the air drawn in from the surroundings by the compressor 3, and a choke check valve 13 connected downstream of the dryer 4. In order to store the air drawn in as system air in the air suspension system 1, a pressure accumulator 11 is provided.

Also provided is a changeover valve device, which connects the compressor 3, the pressure accumulator 11 and the air springs 5 to 8 to one another. This changeover valve device comprises four changeover valves 17 to 20, which are configured as electronically controllable 2/2-way directional control valves. Also provided is a pressure sensor 15, in order to determine the pressure in the various components of the air suspension system. With the pressure sensor 15, the pressure in the individual air springs 5 to 8 and in the pressure accumulator 11 is determined.

In order to provide compressed system air, the compressor 3 draws in air from the atmosphere via an inlet 9. System air can be discharged from the air suspension system 1 via an outlet 10, which can be closed by a switchable discharge valve 16. A power-limiting valve 14 is provided, bridging the compressor inlet and outlet.

On the outlet side of the compressor 3, a first compressed air line 31 leads to a first changeover valve 17 and to a second changeover valve 18. This first compressed air line 31 comprises a first line portion, to the first changeover valve 17, and a second line portion, to the second changeover valve 18.

On the inlet side of the compressor 3, a second compressed air line 32 leads to a third changeover valve 19 and to a fourth changeover valve 20, while a first line portion of the second compressed air line 32 leads to the third changeover valve 19 and a second line portion of the second compressed air line 32 leads to the fourth changeover valve 20.

From the pressure accumulator 11, a third compressed air line 33 leads with a first line portion to the first changeover valve 17 and by way of a second line portion to the fourth changeover valve 20.

Not shown, but may belong to the air suspension system 1 is an electronic control unit, by means of which the compressor 3 or the electric motor 2 is actuated and by means of which the multiplicity of switching valves are opened and closed. A pressure measurement in the air springs 5 to 8 and the pressure accumulator 11 also takes place with the control unit and the pressure sensor 15. A multiplicity of height sensors are also electrically connected to the control unit, in order to measure the spring deflections of the air springs. The calculation of the system air volume takes place from these measurement data in the control unit.

Figure 2:
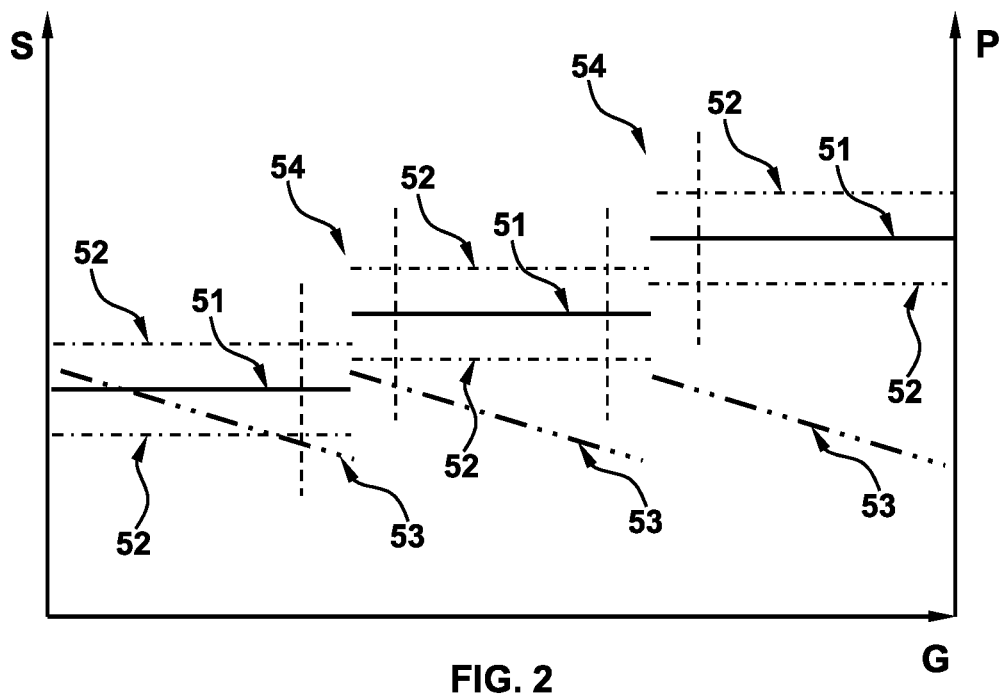
FIG. 2 shows a first loading-dependent adaptation of a system air volume given by way of example.

A diagram with a first loading-dependent adaptation of the system air volume given by way of example is shown in FIG. 2.

The vehicle body weight G is plotted on the x-axis, the system air volume S is plotted on the left and the accumulator pressure P is plotted on the right on the y-axis. The solid line depicts a setpoint system air volume 51, which increases discretely or in stages with the vehicle body weight G. The vehicle body weight means the weight of the sprung mass of the motor vehicle which is sprung by way of the air springs of the air suspension system as opposed to the unsprung mass.

The dash-dotted line depicts a tolerance band 52 for the system air volume. On the basis of the vehicle body weight G, the system air volume may be within a lower and an upper tolerance limit of the tolerance band 52. The tolerance band 52 is chosen such that, during operation, there is a sufficient system air volume for necessary ride-height controlling processes. The dash-double-dotted line shows the falling accumulator pressure 53 in a normal position of the vehicle body on the basis of the increasing vehicle body weight G. If the vehicle body weight G increases, the vehicle is lowered, so that compressed air is delivered into the air springs from the pressure accumulator, in order to achieve the normal position again. The accumulator pressure P thereby decreases. Between the vertical dashed lines there is an adaptation block 54. If the vehicle body weight G lies within the adaptation block 54, no adaptation of the system air volume is performed. This serves inter alia to compensate for the inaccuracy in the loading detection. Only when the vehicle body weight G has left the weight range of the adaptation block 54 in the direction of a next stage of the setpoint system air volume 51 is the system air volume adapted, either by drawing in ambient air or by discharging compressed air into the surroundings.

FIG. 2 reveals that, as opposed to the prior art, the determination of the setpoint system air volume 51 does not increase proportionally to the vehicle body weight G, but increases in discrete stages. The setpoint system air volume 51 increases with increasing vehicle body weight G. For example, three stages of the setpoint system air volume 51 have been established over the overall vehicle body weight G or the vehicle body weight G has been divided into three ranges within which the setpoint system air volume 51 lies at a predetermined value. However, even only two stages are also possible for example. In principle, the stages of the setpoint system air volume 51 should be adapted specifically to each vehicle type.

How an adaptation of the system air volume takes place according to a discretely increasing setpoint system air volume 51 is explained in the following example of use on the basis of FIG. 3.

Figure 3:
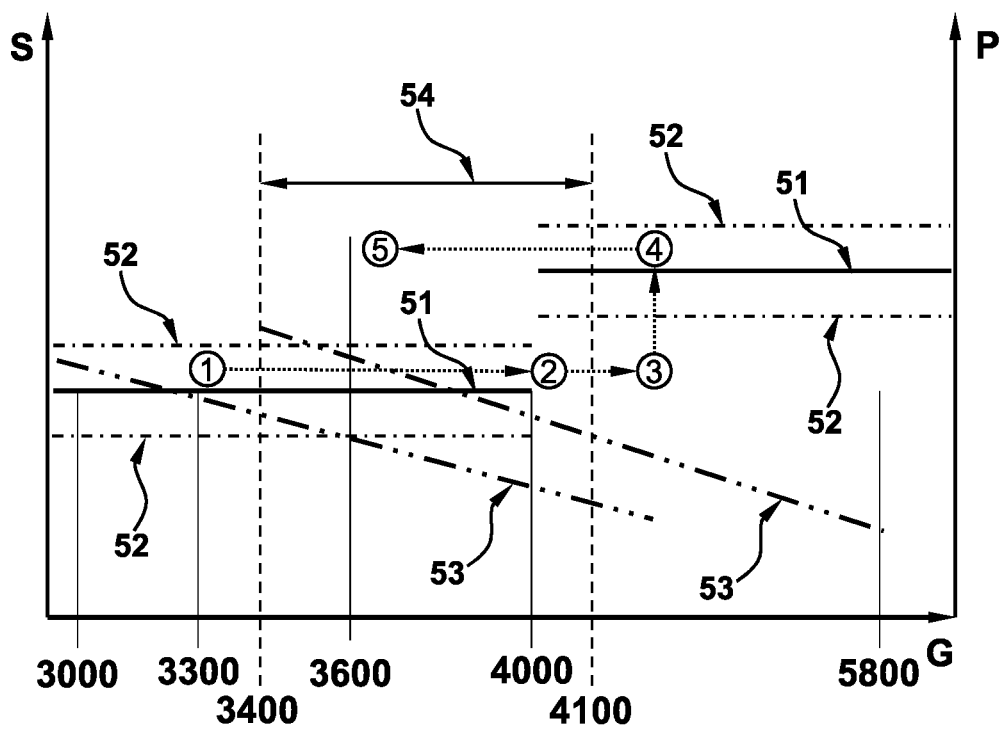
FIG. 3 shows an example of the use of the first loading-dependent adaptation of the system air volume given by way of example.

In FIG. 3, a loading-dependent adaptation of the system air volume in two discrete stages is shown. For step 1, the motor vehicle is pre-loaded with a body weight of 3300 kg. For step 2, the motor vehicle is loaded with an additional 750 kg. The overall body weight is therefore 4050 kg. No adaptation of the system air volume takes place, because the vehicle body weight lies in the adaptation block 54.

Only after the motor vehicle is loaded with a further 100 kg to a body weight of 4150 kg for step 3 is an adaptation of the system air volume performed. This is so because, with this weight, the vehicle body weight lies outside the first stage of the setpoint system air volume 51 and is in the following second stage of the setpoint system air volume 51. Accordingly, the system air volume in the air suspension system lies outside the tolerance band 52 the second stage of the setpoint system air volume 51, so that an adaptation of the system air volume is necessary. This adaptation then takes place to the setpoint value of the system air volume 51 of the second stage. In this second stage, the motor vehicle can then be loaded by a further 1700 kg to its maximum body weight for step 4, without a further adaptation of the system air volume having to be performed.

If the overall weight is then reduced by 750 kg for step 5, no adaptation of the system air volume takes place for example, because the overall weight of the vehicle is again within the range of the adaptation block 54. Therefore, the system air volume remains unadapted in the final state 5. This strategy, given by way of example, of staged system air volume adaptation makes a great loading spread of 2800 kg possible when there is a pressure accumulator with a capacity of 15 liters.

Figure 4:
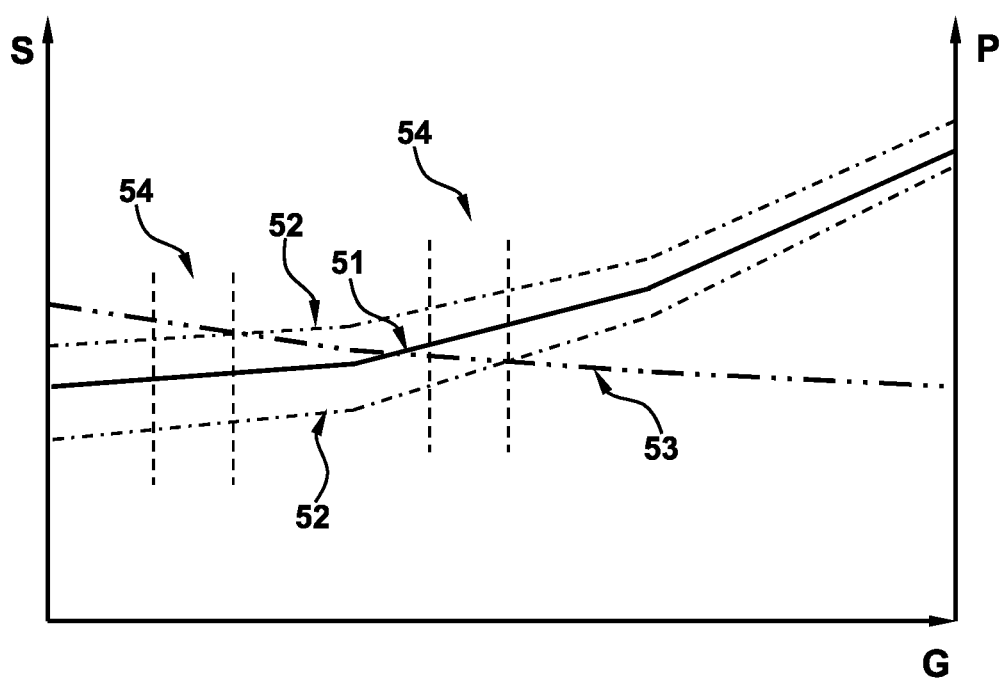
FIG. 4 shows a second loading-dependent adaptation of a system air volume given by way of example.

Finally, FIG. 4 shows in a diagram a second loading-dependent adaptation of a system air volume given by way of example.

The vehicle body weight G is plotted on the x-axis, the system air volume S is plotted on the left and the accumulator pressure P is plotted on the right on the y-axis. The solid line depicts the setpoint system air volume 51, which increases variably with the vehicle body weight G. The dash-dotted line depicts the tolerance band 52 for the actual system air volume, which follows the variable increase in the setpoint system air volume 51. The dash-double-dotted line shows the falling accumulator pressure 53 in a normal position of the vehicle body on the basis of the increasing vehicle body weight G. Between the vertical dashed lines is an adaptation block 54, within which the inaccuracy in the loading detection is compensated.

FIG. 4 reveals that, as opposed to the prior art, the determination of the setpoint system air volume 51 does not increase proportionally to the vehicle body weight G, but increases variably in ranges dependent on the vehicle body weight G. Three ranges of the vehicle body weight G within which the setpoint system air volume 51 increases proportionally in relation to the vehicle body weight G have been established, wherein the increase in the setpoint system air volume 51 in the next range is greater than in the previous range, so that the setpoint system air volume 51 increases variably over the overall vehicle body weight G. The setpoint system air volume 51 therefore approximately follows a progressive path in relation to the increasing vehicle body weight G.

FIG. 5 is a flowchart of an example process 500. In some implementations, one or more process blocks of FIG. 5 may be performed by a device. As shown in FIG. 5, process 500 may include determining a setpoint system air volume on the basis of a vehicle body weight of the motor vehicle (block 502); and setting the setpoint system air volume is set as discretely or variably increasing in relation to the vehicle body weight (block 504). One implementation, alone or in combination with one or more of the implementations comprises, setting an adaptation block on the basis of a vehicle body weight, wherein within which no adaptation of the system air volume takes place (block 506). The adaptation block is lifted after a predetermined time period (block 508). In another implementation, alone or in combination with one or more of the first through eighth implementations, the adaptation of the system air further may include one of taking in ambient air by a compressed air supply device of the air suspension system and discharging some of the system air volume from the air suspension system by way of an outlet of the air suspension system (block 510).

The invention claimed is:
1. A method for adapting a system air volume in an air suspension system of a motor vehicle comprising:
determining a setpoint system air volume on the basis of a vehicle body weight of the motor vehicle; setting the setpoint system air volume as discretely or variably increasing in relation to the vehicle body weight; and
controlling the air suspension system based on the setpoint system air volume.

2. The method as claimed in claim 1, wherein, the discretely increasing setpoint system air volume is constant in relation to the vehicle body weight in a first and a second vehicle body weight range.

3. The method as claimed in claim 2, wherein the setpoint system air volume in the second vehicle body weight range is greater than the setpoint system air volume in the first vehicle body weight range.

4. The method as claimed in claim 1, wherein, with the variably increasing setpoint system air volume, it increases at different rates in relation to the vehicle body weight in a first and a second vehicle body weight range.

5. The method as claimed in claim 4, wherein the setpoint system air volume has a greater rate of increase in the second vehicle body weight range than a rate of increase of the setpoint system air volume in the first vehicle body weight range.

6. The method as claimed in claim 1, wherein an adaptation block, within which no adaptation of the system air volume takes place, is set on the basis of the vehicle body weight.

7. The method as claimed in claim 6, wherein the adaptation block is lifted after a predetermined time period.

8. The method as claimed in claim 6, wherein the adaptation of the system air volume further comprises one of taking in ambient air by a compressed air supply device of the air suspension system and discharging some of the system air volume from the air suspension system by way of an outlet of the air suspension system.

9. The method as claimed in claim 1, wherein a tolerance band, which increases discretely or variably with increasing vehicle body weight, is predetermined for the system air volume.

10. The method as claimed in claim 1, wherein the system air volume is determined from an air volume of a number of air springs and a pressure accumulator of the air suspension system.

11. A method for adapting a system air volume in an air suspension system of a motor vehicle comprising:
receiving at an electronic control unit vehicle body weight data from at least one vehicle sensor;
determining with the electronic control unit a setpoint system air volume on the basis of a vehicle body weight of the motor vehicle; and
adapting a ride height of the air suspension system with the electronic control unit based on the setpoint system air volume,
wherein the setpoint system air volume increases discretely or variably in relation to vehicle body weight.

12. The method as claimed in claim 11, wherein, the setpoint system air volume is constant in relation to the vehicle body weight in a first and a second vehicle body weight range.

13. The method as claimed in claim 12, wherein the setpoint system air volume in the second vehicle body weight range is greater than the setpoint system air volume in the first vehicle body weight range.

14. The method as claimed in claim 11, wherein the setpoint system air volume increases at different rates in relation to the vehicle body weight in a first and a second vehicle body weight range.

15. The method as claimed in claim 14, wherein the increasing the setpoint system air volume has a greater rate of increase in the second vehicle body weight range than a rate of increase of the setpoint system air volume in the first vehicle body weight range.

16. The method as claimed in claim 11, further comprising setting an adaptation block on the basis of vehicle body weight, wherein no adaptation of the system air volume takes place within the adaptation block.

17. The method as claimed in claim 16, further comprising lifting the adaptation block after a predetermined time period.

18. The method as claimed in claim 16, wherein the adaptation of the system air volume further comprises one of taking in ambient air by a compressed air supply device of the air suspension system and discharging some of the system air volume from the air suspension system by way of an outlet of the air suspension system.

19. The method as claimed in claim 11, further comprising setting a predetermined tolerance band for the system air volume, which increases discretely or variably with increasing vehicle body weight.

20. The method as claimed in claim 11, further comprising determining the system air volume from an air volume of a number of air springs and a pressure accumulator of the air suspension system.

* * * * *